Dec. 29, 1959 E. N. LENEY ET AL 2,919,311

DIAL SWITCHES FOR USE IN TELEPHONE OR LIKE SWITCHING SYSTEMS

Filed June 5, 1956 2 Sheets-Sheet 1

Inventors
ERIC NORMAN LENEY
HERBERT GEORGE PROSSER
By
Young, Emery & Thompson
Attorneys Dec. 29, 1959 E. N. LENEY ET AL 2,919,311

DIAL SWITCHES FOR USE IN TELEPHONE OR LIKE SWITCHING SYSTEMS

Filed June 5, 1956 2 Sheets-Sheet 2

Inventors
ERIC NORMAN LENEY
HERBERT GEORGE PROSSER
By
Young, Emery & Thompson
Attorneys United States Patent Office 2,919,311

Patented Dec. 29, 1959

2,919,311

DIAL SWITCHES FOR USE IN TELEPHONE OR LIKE SWITCHING SYSTEMS

Eric Norman Leney and Herbert George Prosser, Liverpool, England, assignors to Automatic Telephone & Electric Company Limited, Liverpool, England, a British company Application June 5, 1956, Serial No. 589,498

Claims priority, application Great Britain June 25, 1955

6 Claims. (Cl. 179—90)

Figure 1:
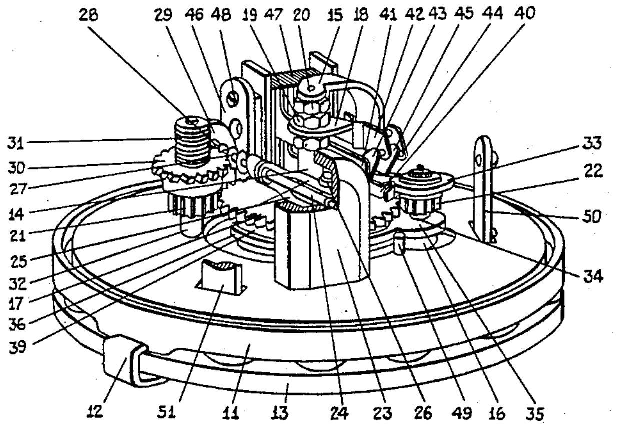

The present invention relates to dial switches for use in telephone or like switching systems.

It is a requirement of dial switches for use with such switching systems that means are provided for ensuring a sufficient pause between trains of impulses to allow the selection equipment to function correctly. This is normally obtained by arranging that the dial finger plate rotates through an angle greater than that required for generating the wanted number of impulses, part of the rotation in the impulse-generating direction being made ineffective in generating impulses. This ineffective part of the rotation may be provided either before or after the impulse train is generated. It is simpler mechanically to provide the ineffective rotation at the end of the return motion of the finger plate, and this can be done by arranging that the impulsing springs are short-circuited or moved out of engagement with their actuating cam as the finger plate reaches a given point towards the end of its restoring rotation. The rotation through the remaining small angle provides the required minimum delay, or "inter-train pause," before the dial is operated again.

The provision of the inter-train pause at the commencement of the return rotation of the finger plate is more difficult, but has the advantage that accidental slight movement of the finger plate from its normal position at the commencement of or during dialling does not result in an unwanted impulse being generated. It is with this type of dial switch that the invention is concerned.

In one existing dial switch employing this principle of operation ,the cam which actuates the impulsing contacts is keyed to the same shaft as the finger plate, and when the latter is being wound, the cam carries with it through a small angle by means of friction a co-axial masking disc. During the winding movement the masking disc prevents the teeth of the cam from engaging with the impulsing springs, and on the return movement of the finger plate, the disc is carried back, again by friction, to its normal position, masking the teeth of the impulsing cam for the first part of its rotation. A minimum inter-train pause of a duration of, say, two impulses is thus obtained before the commencement of each impulse train, regardless of the number of impulses generated.

In another mechanism, the impulsing cam is geared to the main shaft, and in this case the masking member rotates through a much greater angle. Various modificaitons of these arrangements have been employed, in the method of masking the impulsing springs. A disadvantage frequently encountered in mechanisms of this type is the difficulty of obtaining the correct pressure between the masking member and the rotatinp surface which drives it, and wear due to the necessary friction in this part of the mechanism can result in the masking device becoming inoperative.

A further arrangement in a dial switch for providing an inter-train pause before the commencement of the impulse train involves the use of a pivoted member for coupling the impulsing cam to the impulsing springs. In this mechanism, the pivoted member is carried away from the impulsing springs by the cam when the finger plate is rotated in the winding direction. During the return rotation ,the pivoted member is brought into engagement with the impulsing springs only after the impulsing cam has rotated through a small angle which provides the minimum inter-train pause. A disadvantage of this type of mechanism is that it involves the use of delicate moving parts which are difficult to adjust and easily damaged. This type of mechanism is also somewhat noisy.

It is an object of the present invention to provide a dial switch in which the ineffective part of the return rotation of the mechanism which provides the minimum inter-train pause occurs before the impulse train is generated, which is simple and therefore cheap in construction and which overcomes the disadvantages mentioned above.

According to one feature of the invention, in a dial switch arranged so that the ineffective part of the return rotation of the mechanism which provides the minimum inter-train pause occurs before the impulse train is generated an impulsing cam is carried by a member having limited movement away from and towards the impulsing springs on an initial portion of the forward movement of the finger plate and on an initial portion of the return movement thereof respectively whereby the impulsing cam is effective on the impulsing springs only after said initial portion of the return movement.

According to another feature of the invention in a dial switch arranged so that the ineffective part of the return rotation of the mechanism which provides the minimum intertrain pause occurs before the impulse train is generated an impulsing cam is carried by a member which is coupled to the main shaft by frictional means and which rotates with said main shaft from a first angular position to a second angular position during an initial portion of the rotation of said main shaft by the winding movement of the finger plate and from said second position back to said first position during an initial portion of the rotation of said main shaft by the return movement of the finger plate, the impulsing cam being effective to control the operation of the impulsing springs only when it is in said first position.

Figure 2:
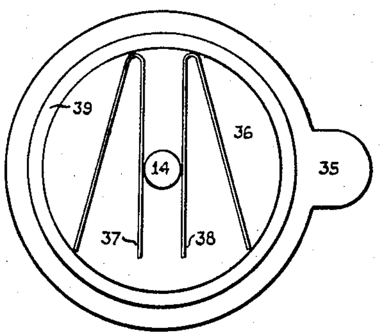
Figure 3:
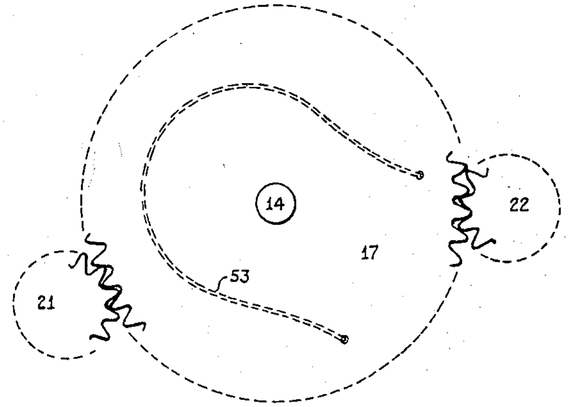
Figure 4:
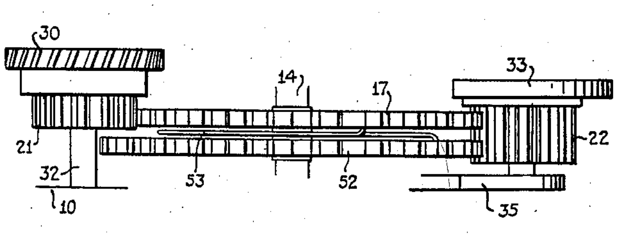

The invention will be understood from the following description of one embodiment, which should be read in conjunction with the accompanying drawings comprising Figs. 1 to 4. Of these Fig. 1 is a general perspective view of a dial switch mechanism incorporating the invention and Figs. 2 to 4 show details of the mechanism.

Referring to the drawing, the dial switch illustrated includes a flat metal base plate 10 on which the mechanism is mounted. To the reverse of the base plate is attached a shell 11, housing the restoring spring and carrying the number plate and finger stop 12. The finger plate 13 is located adjacent the number plate and is pivotally mounted on the base plate by means of the main shaft, to which it is secured. The main shaft 14 has an end bearing in the arm 15 which is mounted on the base plate 10, and a further bearing consists of a bush on a plate 16 secured to the reverse side of the base plate. Keyed to the main shaft is the main gear wheel 17 and the "off-normal" cam 18, the latter being secured by the lock nuts 19 and 20, making the cam readily adjustable. The main gear wheel engages with two pinion wheels 21 and 22, the former being part of the speed control mechanism and the latter being part of the impulsing mechanism.

The speed control arrangements consist of a governor of well-known type, having rotating spring-mounted weights which engage under centrifugal force with the inner surface of a cup. In the embodiment shown in the drawing, the member 23 mounted on the base plate 10 comprises the governor cup, the cylindrical recess in which the governor weight revolves being revealed by the cut-away part in the drawing. The member 23 also provides an end bearing for the governor spindle 24. The governor spindle carries the springs 25 on which the weights, such as 26, are mounted, and has a worm thread 27 cut over part of its length. A bearing 28 is provided for the other end of the governor spindle in a bracket 29. A worm wheel 30 engages with the threaded part of the governor spindle, and this wheel is driven through a helical spring clutch 31 by the pinion 17, all being rotatably mounted on a spindle bearing 32. The main gear wheel 17 rotates with the finger plate, and in so doing, drives the pinion 21, but in the winding or forward direction of rotation of the finger plate the spring clutch 31 becomes slack and the worm wheel 30 remains stationary. During the return movement of the finger plate, the spring clutch grips the collar attached to the worm wheel, and the latter is driven by the pinion 21, in turn rotating the governor mechanism.

The impulsing mechanism includes a three-lobed cam 33 arranged to be rotated by the pinion 22, the cam and pinion being mounted on the same spindle bearing 34. This spindle is rivetted to a projection 35 of a disc 36 which is capable of rotating on the main shaft 14 and in one embodiment is lightly engaged with it by the friction due to a pair of springs 37 and 38. This is shown in Fig. 2 and it will be seen from this drawing, which is not to the same scale as Fig. 1, that the springs are of hair-pin shape and engage with the disc 36 by pressure against the inside of a wall 39 raised a little above the surface of the disc. An alternative to this friction arrangement is shown in Figs. 3 and 4. In this embodiment a second gear wheel 52, similar to 17, is mounted on shaft 14 and is free to rotate on it. A spring 53 has its ends inserted in holes in the gear wheels 17 and 52, one in each, and it is arranged that when the teeth of these wheels mesh with those of the pinion 22 the spring is stressed, and wheel 52 is subject to a turning moment which is clockwise with respect to wheel 17 looking at Fig. 3. It will be seen that gear wheel 52 does not engage with pinion 21. When the dial finger plate is rotated, the two gear wheels 17 and 52 rotate together counterclockwise looking at Fig. 3, but because of the oppositely-directed pressures on the teeth of pinion 22 due to the spring 53, the latter pinion is carried with the gear wheels without rotating on its axis, the disc 36 being in this case freely rotatable on shaft 14.

The moving spring 40 of the pair of impulsing springs 40 and 41 is engaged by the cam 33, the lobes of the cam being arranged to hold the contacts of the springs out of engagement, whereas the flattened portions of the cam allow the contacts to be closed. The single-lobed cam 18 deflects the so called "off-normal" springs 42 and 44 so as to break contact with springs 43 and 45 respectively in the normal position of the dial. All these springs are clamped between insulators to a bracket 46 mounted on the base plate, connection to the springs being made by inserting connecting wires terminated in spade terminals adjacent the appropriate springs in the assembly 47 tightening a clamping screw 48.

When the finger plate is rotated in the forward or winding direction, i.e. counter-clockwise with reference to the drawings, the main shaft 14 also rotates, carrying with it the main gear wheel 17 and the cam 18. The latter disengages with the spring 42, and the two "off-normal" pairs 42 and 43, 44 and 45, now make contact and short-circuit the transmitter and receiver. The pinion 21 is rotated, but the movement is not transmitted by the clutch 31 to the governor. The disc 36 is rotated by means of one of the arrangements previously described, until the projection 35, after rotating through a suitable small angle, reaches a stop fixed to the base plate 10.

While the disc 36 is making this first part of its rotation, there is no relative movement between the engaged teeth of the main gear wheel and the pinion 22, since the latter is carried by the disc 36. When the disc is arrested by the stop just mentioned, further winding of the finger plate will result in the pinion 22 and cam 33 being rotated by the main gear wheel 17. This cam is at this time some distance from the impulsing spring 40, and the latter is therefore not deflected during the winding or forward movement of the finger plate.

When the finger plate is released, it is restored to its normal position by means of the spring housed in the shell 11 and under control of the governor, which is now brought into operation by the clutch 31. At the commencement of the return movement, the disc 36 is carried back to its original position by friction, and is brought to rest when the projection 35 reaches the stop 49. During this part of the return movement the cam 33 is not rotated on its axis, but as soon as the disc 36 becomes stationary the cam is rotated by the main gear wheel 17 and pinion 22. If the finger plate has been rotated by the subscriber to one of its ten operative positions, the cam 33, on returning to its normal position, will present one of its flat faces to the impulsing spring 40. The latter spring will then be deflected by the lobes of the cam as it is rotated during the remaining part of the return movement, and the impulsing springs break contact a number of times corresponding to the position to which the finger plate was displaced. The cam 33 is shaped to give the required ratio of make to break of the impulsing contacts. At the end of the return movement, the cam 18 comes into engagement with spring 42, and the off-normal contacts are again broken.

Posts such as 50 and 51 (the latter cut away in the drawing for clarity) are provided to mount the dial switch in a telephone instrument.

It will be apparent that the mechanism described avoids disadvantages of existing mechanisms in containing no delicate moving parts, and the only adjustments required after assembly are those of spring tensioning. An additional advantage of the construction is its quietness of operation, no ratchet mechanism or reciprocating parts other than the impulsing springs being involved. The simple construction, in which all the mechanism with the exception of the restoring spring is mounted on one side of the flat base plate, facilitates assembly and maintenance.

We claim:

1. In a dial switch for use in automatic telephone systems, a main shaft, a base plate having a bearing for said main shaft, a finger plate fixed to said main shaft, a finger stop fixed relative to said base plate, a member loosely mounted on said main shaft, an impulsing cam mounted on said member, means for driving said impulsing cam from said main shaft, first and second stops for said member and mounted in spaced relation on said base plate, impulsing springs operated by said impulsing cam only when said member is in engagement with said first stop and means coupling said member to said main shaft to enable said member to rotate out of engagement with said first stop and into engagement with said second stop during an initial portion of the rotation of said main shaft by the winding movement of said finger plate and to rotate out of engagement with said second stop and into engagement with said first stop during an initial portion of the rotation of said main shaft by the return movement of the finger plate.

2. In a dial switch for use in automatic telephone systems, a main shaft, a base plate having a bearing for said main shaft, a finger plate fixed to said main shaft, a finger stop fixed relative to said base plate, a member loosely mounted on said main shaft, an impulsing cam mounted on said member, means for driving said impulsing cam from said main shaft, first and second stops for said member and mounted in spaced relation on said base plate, impulsing springs operated by said impulsing cam only when said member is in engagement with said first stop and means frictionally coupling said member to said main shaft to enable said member to rotate out of engagement with said first stop and into engagement with said second stop during an initial portion of the rotation of said main shaft by the winding movement of said finger plate and to rotate out of engagement with said second stop and into engagement with said first stop during an initial portion of the rotation of said main shaft by the return movement of the finger plate.

3. In a dial switch for use in automatic telephone systems, a main shaft, a base plate having a bearing for said main shaft, a finger plate fixed to said main shaft, a finger stop fixed relative to said base plate, a member loosely mounted on said main shaft, an impulsing cam counted on said member, means for driving said impulsing cam from said main shaft, first and second stops for said member and mounted in spaced relation on said base plate, impulsing springs operated by said impulsing cam only when said member is in engagement with said first stop and means flexibly coupling said member to said main shaft to enable said member to rotate out of engagement with said first stop and into engagement with said second stop during an initial portion of the rotation of said main shaft by the winding movement of said finger plate and to rotate out of engagement with said second stop and into engagement with said first stop during an initial portion of the rotation of said main shaft by the return movement of the finger plate.

4. In a dial switch for use in automatic telephone systems, a main shaft, a base plate having a bearing for said main shaft, a finger plate fixed to said main shaft, a finger stop fixed relative to said base plate, a disc loosely mounted on said main shaft, a projection on said disc, an impulsing cam mounted on said projection, means for rotating said impulsing cam from said main shaft, first and second stops for said projection and mounted in spaced relation on said base plate, impulsing springs operated by said impulsing cam only when said projection is in engagement with said first stop and means coupling said member to said main shaft to enable said member to rotate so that said projection moves out of engagement with said first stop and into engagement with said second stop during an initial portion of the rotation of said main shaft by the winding movement of said finger plate and to rotate so that said projection moves out of engagement with said second stop and into engagement with said first stop during an initial portion of the rotation of said main shaft by the return movement of said finger plate.

5. A dial switch as claimed in claim 4 wherein the coupling means comprise a circular wall provided on one face of said disc and two hairpin-shaped springs having their apices and one free end of each engaging with said wall while the arm of each spring terminating in the other free end engages with said shaft.

6. A dial switch as claimed in claim 4 wherein the coupling means comprise a first gear wheel fixed to said main shaft, a second gear wheel loosely mounted on said main shaft, both said gear wheels meshing with a toothed wheel coaxial with said impulsing cam and a stressed spring coupling said gear wheels so that the two gear wheels exert oppositely directed pressures on the teeth of the toothed wheel.

References Cited in the file of this patent

UNITED STATES PATENTS

| | | |
|---|---|---|
| 1,556,905 | Blessing | Oct. 13, 1925 |
| 1,866,669 | Rhodes | July 12, 1932 |
| 2,767,251 | Alexandersson | Oct. 16, 1956 |